United States Patent [19]
Vetterick

[11] Patent Number: 5,461,853
[45] Date of Patent: Oct. 31, 1995

[54] HRSG BOILER DESIGN WITH AIR STAGING AND GAS REBURN

[75] Inventor: Richard C. Vetterick, Akron, Ohio

[73] Assignee: The Babcock & Wilcox Company, New Orleans, La.

[21] Appl. No.: 346,713

[22] Filed: Nov. 30, 1994

[51] Int. Cl.[6] ........................................... F02C 6/18
[52] U.S. Cl. ................... 60/39.02; 60/39.182; 122/7 B
[58] Field of Search ............................. 60/39.02, 39.07, 60/39.182; 122/7 B

[56] References Cited

U.S. PATENT DOCUMENTS

| | | | |
|---|---|---|---|
| 2,298,625 | 10/1942 | Larrecq | 60/59 |
| 2,392,623 | 1/1946 | Traupel | 60/59 |
| 2,453,938 | 11/1948 | Schmidt | 60/59 |
| 2,653,447 | 9/1995 | Heller | 60/49 |
| 3,095,699 | 7/1963 | Baver | 60/39.182 |
| 3,570,261 | 3/1971 | Schwartzman | 62/53 |
| 3,760,776 | 9/1973 | Durrant | 122/459 |
| 3,781,162 | 10/1973 | Rudd et al. | 431/115 |
| 3,803,846 | 4/1974 | Letvin | 60/685 |
| 3,959,972 | 6/1976 | Rudolph et al. | 60/651 |
| 4,085,708 | 4/1978 | Ashdown | 122/7 B |
| 4,116,005 | 9/1978 | Willyoung | 60/655 |
| 4,354,347 | 10/1982 | Tomlinson et al. | 60/39.18 |
| 4,492,085 | 1/1985 | Stahl et al. | 60/649 |
| 5,365,730 | 11/1994 | Bruckner et al. | 60/39.281 |

FOREIGN PATENT DOCUMENTS 1193063  5/1965  Germany ........................... 122/7 B

OTHER PUBLICATIONS

*Steam: its generation and use,* 40th Edition, Copyright ©1992 by The Babcock & Wilcox Company, pp. 31–1 to 31–4 and 31–9.

Piwetz, Brown & Root; Aleman and Smith, Babcock & Wilcox, "A unique approach to a combined cycle unit", Technical paper No. BR–1067, presented to American Power Conference, Chicago, Ill., Apr. 20–22, 1976. Entire paper.

*Primary Examiner*—Louis J. Casaregola
*Attorney, Agent, or Firm*—Robert J. Edwards; Eric Marich

[57] ABSTRACT

A heat recovery steam generator receives combustion gas from a gas turbine exhaust. A duct burner spans an inlet plenum of the heat recovery steam generator and staged exhaust gas is branched from the gas turbine exhaust and supplied to a chamber downstream of the plenum and the duct burner, for the purpose of reducing $NO_x$ and subsequently any CO.

9 Claims, 2 Drawing Sheets

HRSG BOILER DESIGN WITH AIR STAGING AND GAS REBURN

FIELD AND BACKGROUND OF THE INVENTION

The present invention relates in general to heat recovery steam generators (HRSGs), and in particular to a new and useful arrangement which reduces $NO_x$ formation in HRSG boilers.

The use of a second set of burners placed downstream in the combustion flow path of main burners has been used on several installations to reduce the $NO_x$ generated in the first set of burners. This general concept is known as gas reburn and has been demonstrated on several different fuels including gas, oil and pulverized coal.

The application of an HRSG (heat recovery steam generator or boiler) downstream of a gas turbine in the exhaust stream has been put to use in many applications over recent years. The addition of a duct burner in the inlet to the HRSG is somewhat typical of these installations.

The Babcock & Wilcox Company publication *Steam: its generation and use,* 40th Edition, Copyright ©1992, at page 31-2 discloses a gas turbine connected to supply its exhaust to an HRSG, with supplemental fuel being optimally supplied at an inlet plenum thereof. Also see page 31-3 for the construction of an HRSG. Page 31-9 discloses a supplemental duct burner spanning the inlet plenum of an HRSG, downstream of the exhaust outlet from a gas turbine.

Improvements can still be made, for example, by reducing $NO_x$ formation in HRSGs.

SUMMARY OF THE INVENTION

The present invention addresses the problem of high $NO_x$ levels that exist in the gas turbine exhaust coupled to a heat recovery steam generator (HRSG) having a supplementary duct burner. By bypassing a portion of the gas turbine exhaust to a point downstream of the duct burner in the HRSG, and by operating the duct burner in a fuel rich condition, gas reburning can be established and the $NO_x$ from the gas turbine reduced.

The invention comprises an apparatus and a method for operating a gas turbine which has an exhaust gas flow which is mainly supplied to an inlet plenum of an HRSG spanned by a low pressure drop, thorough mixing duct burner. Part of the gas turbine exhaust is branched off as air staging or secondary air which is supplied downstream of the duct burner thereby creating a fuel rich mixture at the duct burner which causes a reburn situation and a reduction of $NO_x$ in that portion of the turbine exhaust gas. The balance of the turbine exhaust gas being supplied downstream contains significant $O_2$ which is utilized to complete combustion and reduce any CO to $CO_2$.

The various features of novelty which characterize the invention are pointed out with particularity in the claims annexed to and forming a part of this disclosure. For a better understanding of the invention, its operating advantages and specific objectives attained by its uses, reference is made to the accompanying drawing and descriptive matter in which the preferred embodiments of the invention are illustrated.

DESCRIPTION OF THE PREFERRED EMBODIMENTS

Figure 1:
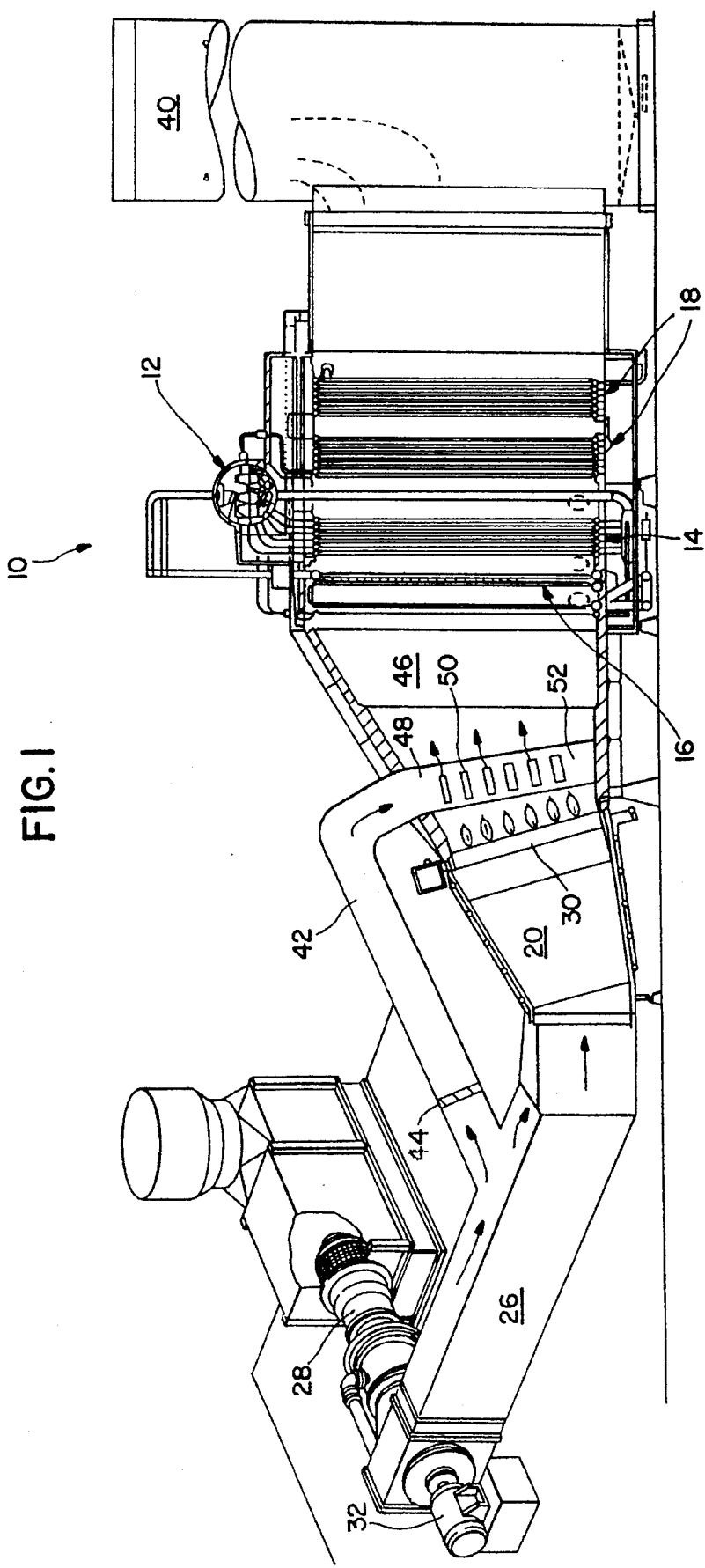
FIG. 1 is a schematic representation of a gas turbine with exhaust combined with an HRSG, including the staging feature of the present invention.

In the drawings, like numerals designate the same or functionally similar elements in the drawings. Referring to FIG. 1, the invention embodied therein comprises a heat recovery steam generator (HRSG) generally designated 10 having an inlet plenum 20 spanned by a duct burner 30 and supplied with combustion gas from an exhaust duct 26 of a gas turbine 28 which powers a generator 32. HRSG 10 is of known design and includes, for example, a high pressure drum 12, and associated heat exchanger surfaces including boiler (steam generator) 14, superheater 16, and economizer 18 surfaces in a conventional manner. The exhaust gases are emitted to atmosphere via stack 40.

According to the present invention, part of the oxygen rich turbine exhaust gas in duct 26 from gas turbine 28 is branched off by means of a gas staging bypass duct 42, flow therethrough being controlled by damper means 44, and supplied to a chamber 46 downstream of the inlet plenum 20 and duct burner 30. This bypasses one portion of the exhaust gas from the gas turbine 28 around the duct burner 30 to a point downstream thereof for the purpose of completing combustion. Gas staging bypass duct 42 is connected to one or more internal duct assemblies 48 having apertures 50 for admitting the bypassed portion of the oxygen-rich exhaust gas into chamber 46. Fuel is supplied to duct burner 30 in an amount sufficient to establish a fuel rich condition at an outlet of the duct burner 30 so that reburning of a portion of the oxygen-rich turbine exhaust gas (combustion air) takes place.

Figure 2:
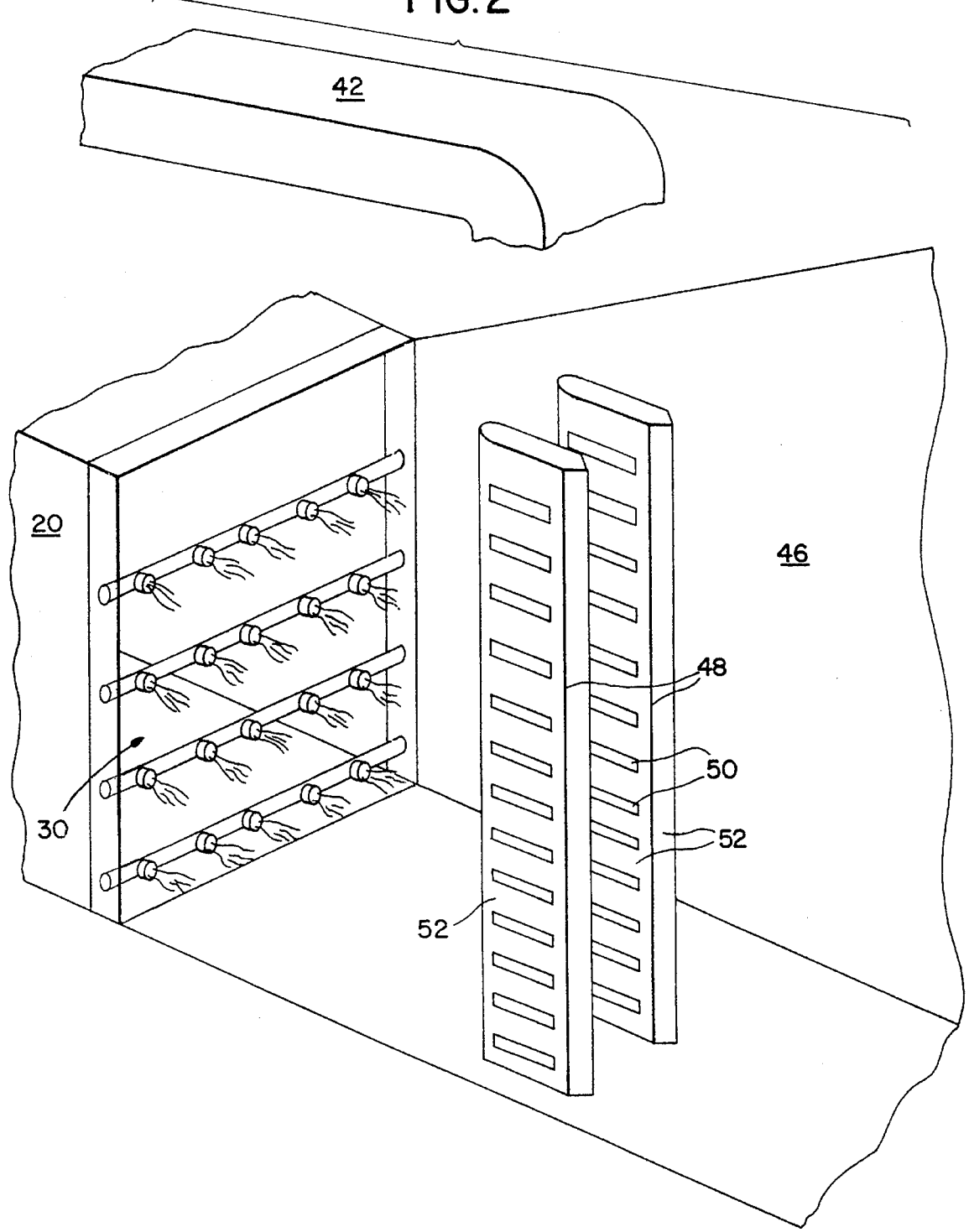
FIG. 2 is a schematic perspective representation of the internal gas duct assemblies of the present invention.

As shown in FIG. 2, the internal gas duct assemblies advantageously comprise one or more vertically extending, laterally perforated, and horizontally spaced internal duct assemblies 48 positioned within chamber 46. Internal duct assemblies 48 are connected to gas staging duct 42 to provide a portion of the oxygen-rich turbine exhaust gas to a location downstream of duct burner 30. Each internal duct assembly 48 is provided with a plurality of apertures or slots 50 for discharging the turbine exhaust gas into the chamber 46. While apertures 50 are shown as slots, other configurations can also be used. For example, apertures 50 can take the form of a plurality of circular holes or perforations spaced in any type of pattern and spaced anyplace along an entire perimeter of walls 52 forming assemblies 48. As indicated earlier, suitable damper means 44 and flow measurement devices (not shown) would be provided in gas staging duct 42 for control and measurement of the amount of turbine exhaust gas provided therethrough and into chamber 46. It is preferred that the internal duct assemblies 48 are located in between any nozzles of duct burner 30 to minimize flame impingement on the assemblies 48. The remaining portion of chamber 46 is left substantially free of obstructions to allow for final complete burnout of any carbon monoxide before the turbine exhaust gases enter the heat exchanger surfaces of the HRSG.

While a specific embodiment of the invention has been shown and described in detail to illustrate the application of the principles of the invention, it will be understood that the invention may be embodied otherwise without departing from such principles.

I claim:

1. A heat recovery steam generator apparatus which produces reduced $NO_x$ emissions, comprising:

a heat recovery steam generator having an inlet plenum;

a gas turbine having an exhaust duct for discharging oxygen-rich exhaust gas from the gas turbine;

a duct burner spanning the inlet plenum of the heat recovery steam generator, the exhaust duct of the gas turbine being connected directly to the inlet plenum upstream of the duct burner for supplying a first portion of the exhaust gas thereto;

means for supplying fuel to the duct burner to produce a fuel-rich mixture at an outlet thereof; and a gas staging bypass duct branched from the exhaust duct of the gas turbine and connected directly to one or more internal duct assemblies located within a chamber downstream of the inlet plenum and the duct burner of the heat recovery steam generator, the one or more internal duct assemblies having apertures for admitting a bypassed second portion of the oxygen-rich turbine exhaust gas around the duct burner to a point downstream thereof and provide the second portion of the oxygen-rich turbine exhaust gas to the chamber together with the first portion of the turbine exhaust gas flowing through the duct burner for the completion of combustion of the fuel and for the reduction of $NO_x$ and CO.

2. The apparatus according to claim 1, further comprising damper means for controlling the rate of turbine exhaust gas flowing through the gas staging bypass duct.

3. A method of operating a heat recovery steam generator apparatus having a duct burner spanning an inlet plenum to reduce $NO_x$ emissions, comprising the steps of:

supplying a first portion of oxygen-rich exhaust gas from a gas turbine to the inlet plenum, upstream of the duct burner;

operating the duct burner to produce a fuel-rich mixture at an outlet thereof to reduce $NO_x$ in the first portion of the oxygen-rich turbine exhaust gas; and supplying a second portion of oxygen-rich turbine exhaust gas which is branched off from a location upstream of the duct burner into one or more internal duct assemblies positioned within a chamber located downstream of the duct burner, the one or more internal duct assemblies having apertures to provide the second portion of the oxygen-rich turbine exhaust gas to the chamber together with the first portion of the oxygen-rich turbine exhaust gas having just passed through the duct burner for combustion completion and $NO_x$ reduction in the chamber.

4. The apparatus according to claim 1, wherein the one or more internal duct assemblies comprise one or more vertically extending, laterally perforated, and horizontally spaced internal duct assemblies.

5. The apparatus according to claim 1, wherein the apertures in the one or more internal duct assemblies comprise a plurality of slots.

6. The apparatus according to claim 1, wherein the apertures in the one or more internal duct assemblies comprise a plurality of perforations.

7. The apparatus according to claim 6, wherein the perforations are spaced in any type of pattern and spaced any place along an entire perimeter of walls forming the assemblies.

8. The apparatus according to claim 1, wherein the duct burner has a plurality of nozzles and the one or more internal duct assemblies are located in between said nozzles to minimize flame impingement on the assemblies.

9. The apparatus according to claim 4, wherein a remaining portion of the chamber is left substantially free of obstructions to allow for final complete burnout of any carbon monoxide before the turbine exhaust gases enter a heat exchanger surface downstream of said chamber.

* * * * *